United States Patent
Moschopedis et al.

[15] 3,700,728
[45] Oct. 24, 1972

[54] SOLUBILIZATION OF HUMIC ACIDS, LIGNITES AND COALS

[72] Inventors: Speros E. Moschopedis; Ernst Czakert; Stephen M. Creighton, all of Edmonton, Canada

[73] Assignee: Canadian Patents and Development Limited, Ottawa, Ontario, Canada

[22] Filed: Dec. 30, 1968

[21] Appl. No.: 787,995

[30] Foreign Application Priority Data

Jan. 4, 1968  Canada......................9,114

[52] U.S. Cl................................260/507 R, 252/8.5
[51] Int. Cl.............................................C07c 143/52
[58] Field of Search...................260/507 R, 125, 514

[56] References Cited

UNITED STATES PATENTS

| | | | |
|---|---|---|---|
| 2,172,301 | 9/1939 | Sutterlin et al. | 260/507 |
| 3,352,902 | 11/1967 | Moschopedis | 260/507 |

FOREIGN PATENTS OR APPLICATIONS

| | | | |
|---|---|---|---|
| 478,272 | 6/1929 | Germany | 260/507 |

*Primary Examiner*—Daniel D. Horwitz
*Attorney*—I. William Millen

[57] ABSTRACT

A process for the preparation of water-soluble products from humic acids, lignites and pre-oxidized coals which are reacted with a sulfonating agent to form a sulfite or a bisulfite in situ, in an alkaline medium. The water-soluble product is useable as a well-drilling fluid.

7 Claims, No Drawings

SOLUBILIZATION OF HUMIC ACIDS, LIGNITES AND COALS

This invention relates to the solubilization of water-insoluble humic acids, lignites, and certain coals or water-insoluble coal derivatives. The coal derivatives, such as humic acids, are characterized by their alkali solubility due to the presence in their molecule of acidic functional groups but they are water-insoluble. This invention relates to the solubilization of either naturally occurring humic acids which result from weathering of lignites and coals, or those manufactured from coal by one of the several known conventional methods used for this purpose.

Humic acids are complex materials that may be obtained from coal by mild oxidation (e. g. in air or by certain liquid-phase oxidants) and subsequent extraction of the oxidized mass with aqueous alkalis, or by direct alkali extraction of in situ weathered coal. They may be recovered from the resultant alkali solution by precipitation with a slight excess of acid.

Humic acids are dark brown to black water- and acid-insoluble, alkali-soluble high molecular weight organic materials. Since they contain acidic functional groups such as phenolic hydroxyl and carboxyl, they are alkali-soluble.

Humic acids and lignites have been used to control the viscosity of oilwell drilling muds, but their usefulness as thinners for muds has been limited because they are much less effective and practically useless in the presence of commonly encountered mud contaminants such as sodium chloride, calcium sulfate, cement, etc. These mud contaminants will progressively coagulate the humic acids or lignites so that they can no longer exert their effect on the colloidal properties of the mud.

Sulfonated and/or sulfated organic materials are known to have utility in drilling fluids. Examples include: ammonium or alkali metal salts of sulfonated asphalts U.S. Pat. No. 3,028,333 issued Apr. 3, 1962 to Charles A. Stratton et al); lignite disulfide, lignite sulfones and sulfoxides and lignite sulfonates (U.S. Pat. No. 3,309,958 issued June 19, 1962 to Kenneth P. Monroe); and sulfonated asphaltene constituents of petroleum oils (U.S. Pat. No. 3,190,837 issued June 22, 1965 to Joseph U. Messenger). The sulfonating and/or sulfating agents suggested have included fuming sulfuric acid, chlorosulfonic acid, concentrated sulfuric acid and sulfur trioxide.

Previously, humic acids and coals have been directly sulfonated, i. e. treated with a sulfonating agent such as sulfuric acid, to introduce sulfonic acid or sulfonate groups, but these sulfonated products were not water-soluble and could not be dissolved, purified and otherwise treated as an organic chemical. They have usually found application as ion exchange materials.

Water-soluble acids have previously been obtained by severe oxidation treatments of humic acids and some coals, but far-reaching molecular breakdown has always accompanied the oxidation, and the water-soluble products were, therefore, extensively degraded materials.

Recently, there has been considerable interest in the use of water-soluble or water-dispersible humic acids as drilling mud thinners, soil conditioners, and tanning agents.

It is now known (see Canadian Pat. No. 722,720 issued Nov. 30, 1965 to Speros E. Moschopedis) that humic acids, lignites and preoxidized sub-bituminous coals may be solubilized by a process which comprises reacting with alkali hydroxymethane sulfonate solution, precipitating the soluble sulfomethylated product with concentrated acid, and purifying the product to remove inorganic and insoluble materials.

Such water-soluble or water-dispersible products have been found to be effective drilling mud thinners especially with contaminated muds.

An object of one broad aspect of this invention is the provision of a process for solubilizing humic acids, lignites and pre-oxidized coals.

An object of another aspect of this invention is to provide a process of treating humic acids, lignites, and pre-oxidized coal, to convert them into an effective water-soluble product for drilling mud thinner.

An object of yet another aspect of this invention is to provide a process for the introduction of sulfur-bearing groups into the humic acid molecule.

An object of a further aspect of this invention is to provide a drilling mud thinner of the foregoing types to control the rheological properties of the mud, particularly when the mud is contaminated with salt, and gypsum.

An object of yet another aspect of this invention is to provide a novel water-soluble product from humic acids, lignites and pre-oxidized coals.

An object of another aspect of this invention is to provide a method for controlling the viscosity, yield point, and gel strength of a mud through the use of a humic acid reaction product of the type described.

An object of a further aspect of this invention is to provide a process for the production of a novel halogenated product derived from humic acids, lignites and pre-oxidized coals.

An object of still a further aspect of this invention is the provision of a novel halogenated product derived from humic acids, lignites and pre-oxidized coals.

By one broad aspect of this invention, a process is provided for the preparation of water-soluble products from humic acids, lignites and pre-oxidized coals comprising: reacting humic acids, lignites or pre-oxidized coals with a sulfonating agent selected from the group consisting of a sulfite, a bisulfite and precursors thereof which form a sulfite or a bisulfite in situ, in an alkaline medium, and recovering a water-soluble product from the reaction medium.

By another aspect of this invention, a novel product is provided which is the reaction product of humic acids, lignites or pre-oxidized coals with a sulfonating agent selected from the group consisting of a sulfite, and a bisulfite when carried out in alkali medium.

By yet another aspect of this invention, a process is provided which comprises reacting humic acids, lignites or pre-oxidized coals with a sulfonating agent selected from the group consisting of a sulfite, a bisulfite and precursors thereof which form a sulfite or a bisulfite in situ, in an alkaline medium, to provide a water-soluble product; and halogenating said water-soluble product in homogeneous liquid phase.

By still another aspect of this invention, a further novel product is provided which is the halogenated reaction product of humic acids, lignites and pre-oxidized coals with a sulfonating agent selected from the group consisting of a sulfite and a bisulfite, when carried out in alkali medium.

By a further aspect of this invention, a well-working fluid is provided comprising a fluid medium and the reaction product of humic acids, lignites or pre-oxidized coals with a sulfonating agent selected from the group consisting of a sulfite, and a bisulfite when carried out in alkali medium. By a still further aspect of this invention, an improved process is provided for drilling a well with well-drilling tools, the improvement residing in the step of circulating in said well an aqueous base-drilling fluid comprising water and the reaction product of humic acids, lignites or pre-oxidized coals with a sulfonating agent selected from the group consisting of a sulfite and a bisulfite when carried out in alkali medium.

In accordance with an embodiment of the present invention, humic acids, lignites, and pre-oxidized sub-bituminous coals are reacted at elevated temperatures in an alkali aqueous solution with alkali sulfite or bisulfite. The reaction has been found to proceed better at elevated temperatures. At room temperature, the reaction time to produce a water-soluble product which will not precipitate upon acidification with 5% hydrochloric acid is over 6 hours. On the other hand, such water-soluble products are prepared at reflux temperatures (about 100° C.) in about 1 hour and at higher temperatures (about 140°– 180° C. under pressure) within about 10 minutes. An excess of sulfite or bisulfite is usually added to ensure complete reaction. As mentioned, the products from these reactions are water-soluble and were found to stay in solution after acidification with 5 percent hydrochloric acid solution.

A new process is now provided by which humic acids, lignites and pre-oxidized sub-bituminous coals are reacted in an alkali medium, with a sulfite or bisulfite solution to produce a water-soluble derivative. This new process does not require reaction with formaldehyde, and consequently, requires less equipment, is simpler technologically and consequently, economically advantageous. The alkali sulfites or bisulfites that are suitable are those of sodium, potassium or ammonium. Alternatively, sulfurous acid or sulfur dioxide can be passed into an alkaline solution forming in situ the alkali metal sulfite or bisulfite salt. The hydroxides or carbonates of sodium, potassium and ammonium, as well as any other salts of these cations which will provide in an aqueous solution an alkalinity of pH greater than 7.0 form suitable aqueous alkaline solutions.

In the case of humic acids obtained by extraction with alkali from lignites and pre-oxidized coals, substantially the entire product is completely water-soluble.

With lignites and pre-oxidized low rank coals, the yield of soluble products depends on the amount of humic acids originally present. The humic acid content of coals can be altered and increased by oxidation. Oxidation of lignites and low rank coals can be accomplished by any of the several conventional processes in use for oxidizing coals. Concentrated and dilute nitric acid, sodium and hydrogen peroxides, chlorine gas or alkali hypochlorite, sodium nitrite, and alkali-air may be employed as oxidizing reagents.

The pressure at which the oxidation reaction can be performed can vary over wide limits; usually atmospheric pressure is preferred.

The oxidation reaction temperature can also vary considerably, but precautions have to be taken to prevent the reaction becoming vigorous and out of control, especially with oxidants like nitric acids, and sodium or hydrogen peroxides. An oxidation temperature in the range of 80° to 100° C. usually represents a maximum. In practice, however, a temperature range from 30° to 100° C. can be used.

It is usually desirable to purify the water-soluble products to remove inorganic residues and insoluble materials. This may be done by washing with 10 percent (or more concentrated) mineral acid, electrodialyzing in water or passing through an ion exchange resin. Other purification techniques are also possible. Purification is important for many applications as it results in virtually complete demineralization and removal of insolubles. Demineralization of the initial water-soluble product with 10 percent HCl has been found to lower the mineral content to less than 0.1 percent and often to less than 0.05 percent.

The water-soluble products can be directly halogenated, e. g. by reaction in a homogeneous aqueous solution with chlorine or bromine to incorporate up to about 25 percent by weight halogen. This introduction of halogen into the molecule appears to involve mainly an addition reaction and concurrent oxidation is slight. It has also been found that unless the treatment with halogen is continued for many hours, the molecular degradation (by oxidation) is negligible. Various conditions and reactants can be used for the halogenation. Chlorination has been rapidly effected by saturating a dilute aqueous solution of the sulfonated product with $CCl_4$ and exposing to an ultrasonic field. However, simply bubbling the halogen gas through an aqueous solution at room temperature is also quite effective.

The water-soluble products in their various forms prepared herein are useful as tanning agents, additives to control the flow properties of drilling muds, cements or paints, and as intermediates in the production of high purity electrode carbons and graphites from coal.

Besides their usefulness as drilling mud thinners and tanning agents, the water-soluble sulfonated products are useful as additives to control the flow properties of cements, and, as fertilizers and soil conditioners in the form of alkali, alkali earth and ammonium salts. The halogenated products of the sulfated humic acids and coal derivatives are useful as inexpensive biocidal agents, and as flame-retardant additives to materials such as asphalts and paints.

The following examples will serve to illustrate the aspects of this invention:

Example I 50 grams of in-situ-weathered sub-bituminous coal from the Sheerness region of Alberta, Canada, were ground to -100 mesh and suspended in 200 ml. of 8 percent sodium hydroxide solution. To this mixture, 14 grams of sodium bisulfite were added, and refluxed for 2 to 3 hours at about 100° to 105° C. The reaction mixture was centrifuged to remove insoluble material and the solution was dried.

A dark brown water-soluble humic acid solid was obtained. The thinning properties of the product are shown in Table I.

Example II

The same procedure as in Example I was followed except that 100 grams of Sheerness coal were treated with 25 grams of both sodium hydroxide and sodium bisulfite.

The thinning properties of the water-soluble product are shown in Table I.

Example III 100 grams of Sheerness coal (-100 mesh) were suspended in a solution of 25 grams potassium hydroxide in 400 ml. water, sulfur dioxide was passed through it until the PH was in the range of 8.0 to 9.0, and the mixture was refluxed for 3 hours at about 100° to 105° C. The reaction mixture was centrifuged to remove insoluble material and the solution was dried. A dark brown water-soluble solid was obtained; its thinning properties are shown in Table I.

Example IV

The same procedure was followed as in Example III, except that sodium hydroxide instead of potassium hydroxide was employed. The results were the same.

Example V 50 grams of in-situ-weathered sub-bituminous coal from the upper seam of Dodd's Mine at Tofield region of Alberta, Canada, were ground to -100 mesh and suspended in a mixture of 200 ml. water, 15 grams sodium carbonate and 12.5 grams sodium bisulfite, and refluxed for 3 hours at about 100° to 105° C. The reaction mixture was further treated as in Example I, giving a water-soluble product.

Example VI

The same procedure was followed as in Example V, except that sodium bisulfite was formed in situ by passing sulfur dioxide through the reaction mixture until the pH was in the range of 8.0 to 9.0. A water-soluble humic acid product was recovered.

Example VII

The same procedure was followed as in Example V, except that Sheerness coal was used, and sodium sulfite instead of sodium bisulfite was used.

The thinning properties of the water-soluble product are shown in Table I.

Example VIII 50 grams of Sheerness coal (-100 mesh) were suspended in a solution of 12.5 grams sodium hydroxide in 200 ml. water, sulfur dioxide was passed through it until the pH was in the range of 8.0 to 9.0 and the mixture was autoclaved for 3 hours at a temperature of 145° to 150° C. The reaction mixture was further treated as in Example I. The thinning properties of the water-soluble product are shown in Table I.

Example IX 50 grams of Sheerness coal (-100 mesh) were suspended in a mixture containing 20 ml. of concentrated nitric acid in 150 ml. of water and refluxed for 2 to 3 hours. The oxidized sub-bituminous coal was separated by centrifuging and was washed from the excess of acid with water and centrifuged again; and finally was suspended in alkali solution and was treated as described in one of the previous experiments.

The thinning properties of the water-soluble product (prepared according to a procedure similar to Example II) are shown in Table I.

Example X 50 grams of Dodd's Mine coal (as in Example V) (-100 mesh) were suspended in 200 ml. of water and chlorine gas passed through for about 2 hours at a rate of about 5 cc. per minute. The excess of chlorine was expelled by heating the reaction mixture, then was centrifuged, washed with water and centrifuged, and finally suspended in alkali solution and treated as described in one of the previous Experiments I to VIII. A water-soluble humic acid product was recovered.

Example XI

Sheerness coal (-100 mesh) was suspended in 15 percent sodium hydroxide solution (based on the weight of coal), and oxidized by bubbling air through it for 3 to 18 hours at a temperature about 100° to 105° C.

The air-oxidized coal was further treated as described in one of the previous Experiments I to VIII.

Example XII

Sheerness coal (-100 mesh) was suspended in water and was oxidized with 2.5, 5 and 10 percent sodium peroxide (based on the weight of coal) by refluxing for about 1 to 2 hours. The oxidized product was further treated as described in one of the previous Experiments I to VIII.

The same procedure was followed when 30 percent hydrogen peroxide was used. Water-soluble humic acid products were obtained.

Example XIII 50 grams of Sheerness coal (-100 mesh) were suspended in a solution of 2.5 grams of sodium nitrite in 200 ml. of water and 40 ml. of 1N hydrochloric acid solution was added gradually, and the mixture then was left to react at room temperature for about 3 hours while stirring. The reacted coal was separated by centrifuging, suspended in alkali solution and treated as described in one of the previous Experiments I to VIII. The thinning properties of the water-soluble product (prepared according to a procedure similar to Example II) are shown in Table I. The same results were obtained when Sheerness coal was refluxed for about 2 to 3 hours with sodium nitrite.

The thinning properties and comparison of some products prepared according to this invention, with commercial thinners, are illustrated in Table I.

The rheological properties of bentonitic muds were measured with a Fann V.G. viscosimeter, Model No. 35, and fluid loss was measured by applying 100 pounds per square inch pressure, and determining the filtrate during 30-minute periods in a manner similar to that described in "Principles of Drilling Mud Control," of the American Petroleum Institute, tenth edition, 1955.

The evaluation of a thinner is based upon its ability to lower the viscosity, yield point, gel strength, and filter loss of a mud. Contaminants such as sodium chloride, calcium sulfate, cement, etc., produce adverse effects on these properties. A mud with high viscosity, gel strength, and filter loss is useless. Low viscosity, very low loss of fluid to the formation, combined with a thin and compressible wall cake, is of vital importance. High fluid loss will lead to the deposition of a thick cake of mud solids on the walls of the bore hole and will develop resisting forces to drilling pipe (e. g. friction). This, combined with high viscosity of mud, will make drilling conditions impossible.

It can be seen in Table I that while the thinning properties, such as viscosity and yield point, of the products of this invention are comparable with those of commercial thinners, the gel strengths and filter loss are superior.

material and the solution was dried. A dark brown solid was obtained which, when dissolved in water, gave a pH of 6.7.

Example XV 50 grams of Dakolite were treated as in Example XIV with 7 grams of sodium sulfite. When the dry product was dissolved in water, it had a pH of 5.6.

Example XVI 50 grams of Dakolite were treated with a solution of 7 grams of sodium sulfite in 200 ml. of water by refluxing for 2 hours. The reaction mixture was dried without the removal of insoluble matter.

Example XVII

Same as Example XVI, except that the reaction time was extended to 4 hours.

TABLE I
[Thinning properties and comparison of sulfated products with commercial thinners]

| Description of additive | Lbs./bbl. | NaOH, lbs./bbl. | CaSO4, lbs./bbl. | pH | Viscosity, 600 r.p.m. | Plastic viscosity, centipoise | Yield point, lbs./100 sq. ft. | Gel strength, lbs./100 sq. ft. 10 sec. | Gel strength, lbs./100 sq. ft. 10 min. | Filter loss, cc. at 100 lbs./sq. in. |
|---|---|---|---|---|---|---|---|---|---|---|
| *Base mud | | 0 | 0 | 8.9 | 44 | 12 | 22 | 23 | 37 | 12.0 |
| **Sodium humate | 8 | 0.25 | 3 | 10.3 | 125 | 40 | 45 | 16 | 295 | |
| Product from Example I | 6 | 1.25 | 3 | 12.0 | 28 | 12 | 4 | 0 | 17 | 8.0 |
| Product from Example II | 6 | 1.25 | 3 | 12.0 | 27 | 11 | 5 | 0 | 5 | 8.0 |
| Product from Example III | 6 | 1.25 | 3 | 12.2 | 29 | 12 | 5 | 1 | 12 | |
| Product from Example VII | 6 | 1.25 | 3 | 12.4 | 23 | 11 | 1 | 0 | 2 | 7.0 |
| Product from Example VIII | 6 | 1.25 | 3 | 12.4 | 29 | 13 | 3 | 0 | 4 | 7.0 |
| Product from Example IX | 6 | 1.25 | 3 | 12.3 | 28 | 13 | 2 | 0 | 2 | |
| Product from Example XIII | 6 | 1.25 | 3 | 12.4 | 34 | 15 | 4 | 0 | 7 | 7.0 |
| Sulfomethylated sheerness coal | 6 | 1.12 | 3 | 12.2 | 24 | 11 | 2 | 0 | 0 | 7.5 |
| Chrome lignosulfonate | 6 | 0.5 | 3 | 10.2 | 39 | 9 | 21 | 11 | 26 | |
| Do | 8 | 0.75 | 3 | 10.5 | 22 | 10 | 2 | 0 | 9 | 11.0 |
| Quebracho | 6 | 0.75 | 3 | 8.8 | 23 | 16 | 1 | 5 | 23 | 32.0 |

*Aqueous suspension of 25 lbs./bbl. Wyoming bentonite. **Sodium salt of humic acids extracted from sheerness sub-bituminous coal.

TABLE IA
[Thinning properties of sulfated products]

| Description of additive | lbs./bbl. | NaOH, lbs./bbl. | CaSO4, lbs./bbl. | pH | Viscosity, 600 r.p.m. | Plastic viscosity, centipoise | Yield point, lbs./100 sq. ft. | Gel strength lbs./100 sq. ft. 10 sec. | Gel strength lbs./100 sq. ft. 10 min. | Filter loss, lbs./sq. in. |
|---|---|---|---|---|---|---|---|---|---|---|
| *Base mud | | | | 8.7 | 51 | 14 | 23 | 21 | 39 | 12.0 |
| Product from Example XIV | 2 | 1.5 | | 12.4 | 22 | 10 | 2 | 1 | 12 | |
|  | 4 | 1.5 | | 12.4 | 21 | 9 | 3 | 0 | 6 | |
|  | 6 | 1.5 | | 12.35 | 26 | 11 | 4 | 1 | 10 | |
|  | 6 | 1.5 | 3 | 12.25 | 28 | 12 | 4 | 1 | 18 | 7.8 |
| Base mud | | | | 8.7 | 45 | 11 | 23 | 20 | 37 | 12.0 |
| Product from Example XVI | 2 | 1.5 | | 12.55 | 17 | 8 | 1 | 1 | 7 | |
|  | 4 | 1.5 | | 12.5 | 15 | 7 | 1 | 2 | 5 | |
|  | 6 | 1.5 | | 12.5 | 15 | 7 | 1 | 2 | 2 | |
|  | 6 | 1.5 | 3 | 12.4 | 22 | 10 | 2 | 0 | 22 | 9.8 |
| Base mud | | | | 8.7 | 42 | 11 | 20 | 16 | 34 | 12.0 |
| Product from Example XVIII | 2 | 1.5 | | 12.4 | 24 | 10 | 4 | 2 | 27 | |
|  | 4 | 1.5 | | 12.35 | 20 | 9 | 2 | 2 | 2 | |
|  | 6 | 1.5 | | 12.3 | 20 | 9 | 2 | 2 | 2 | |
| 5% NaOH | 6 | 1.5 | 3 | 12.2 | 28 | 11 | 6 | 2 | 12 | 8.2 |
| Base mud | | | | 8.7 | 41 | 10 | 21 | 17 | 35 | 12.0 |
| Product from Example XVIII | 2 | 1.5 | | 12.4 | 27 | 10 | 7 | 3 | 28 | |
|  | 4 | 1.5 | | 12.4 | 20 | 8 | 4 | 2 | 8 | |
|  | 6 | 1.5 | | 12.4 | 20 | 9 | 2 | 2 | 9 | |
| 15% NaOH | 6 | 1.5 | 3 | 12.4 | 23 | 11 | 1 | 1 | 4 | 8.6 |

*Aqueous suspension of 25 lbs./bbl. Wyoming bentonite.

Example XIV 50 grams of Dakota lignite, a product of Wyo-Ben Company, sold under the Trade Mark of "Dakolite," were suspended in a solution of 15 grams sodium sulfite in 200 ml. of water, and refluxed for 2 hours. The reaction mixture was centrifuged to remove insoluble

Example XVIII

Same as Example XVII, except that the reaction was performed in the presence of 5, 10, 15 and 20 percent sodium hydroxide based on the weight of lignite.

The thinning properties of some of the products are shown in the attached tables.

TABLE IB
[Thinning properties of sulfated products]

| Description of additive | Lbs./bbl. | NaOH, lbs./bbl. | CaSO₄, lbs./bbl. | pH | Viscosity, 60 r.p.m. | Plastic viscosity, centipoise | Yield point, lbs./100 sq. in. | Gel strength 1 sec. | Gel strength 10 min. | Filter loss, c.c. |
|---|---|---|---|---|---|---|---|---|---|---|
| *Base mud | | | | 8.5 | 56 | 14 | 28 | 20 | 37 | 12.2 |
| Product from Example XXII | 2 | 1.5 | | 12.2 | 26 | 11 | 4 | 1 | 10 | |
|  | 4 | 1.5 | | 12.1 | 22 | 10 | 2 | 1 | 2 | |
|  | 6 | 1.5 | | 12.0 | 20 | 9 | 2 | 1 | 2 | |
|  | 6 | 1.5 | 3 | 11.6 | 29 | 13 | 3 | 1 | 4 | 7.8 |
| Product from Example XXIII | 2 | 1.5 | | 12.7 | 25 | 10 | 5 | 0 | 25 | |
|  | 4 | 1.5 | | 12.3 | 21 | 10 | 1 | 0 | 4 | |
|  | 6 | 1.5 | | 11.7 | 21 | 10 | 1 | 0 | 2 | |
|  | 6 | 1.5 | 3 | 10.5 | 26 | 11 | 4 | 0 | 2 | 9.0 |
| **Calcium treated base mud | | | | 12.5 | 93 | 7 | 79 | 9 | 20 | 120 |
| Product from Example XXIII | 2 | | | 12.9 | 23 | 6 | 1 | 7 | 10 | |
|  | 4 | | | 12.9 | 12 | 6 | 0 | 1 | 3 | |
|  | 6 | | | 12.8 | 10 | 5 | 0 | 0 | 2 | 79 |
| Product from Example XXIV | 2 | | | 12.6 | 25 | 8 | 9 | 9 | 12 | |
|  | 4 | | | 12.8 | 15 | 7 | 1 | 3 | 9 | |
|  | 6 | | | 12.9 | 14 | 6 | 2 | 0 | 4 | 81 |

*Aqueous suspension of 25 lb./bbl. Wyoming bentonite.
**Aqueous suspension of 25 lb./bbl. Wyoming bentonite, 5 lb./bbl. calcium oxide, 2 lb./bbl. sodium hydroxide.

Example XIX

Ammonium Salt

The procedure of Example III was repeated except that ammonium hydroxide was used instead of potassium hydroxide. A dark brown water-soluble solid was obtained in the form of its ammonium salt.

Example XX

Free Acids

Products in their free acid form may be obtained by precipitating the water-soluble products from Examples I – XIX by the addition of a concentrated mineral acid (e. g. hydrochloric acid), centrifuging, washing the precipitate with about 10% acid solution to avoid peptisation, and recentrifuging, and finally drying.

Example XXI

The water-soluble humic acid products of Examples I – XVIII, in their acid form, were chlorinated as follows: Two gram quantities of the products were dissolved in 2000 ml. of water and gaseous chlorine bubbled through the solutions for 20 minutes at a rate of about 50 cc. per minute. The color of the solutions changed progressively from brown to pale yellow during this treatment. The products were then recovered by evaporation to dryness on a steam bath and on analysis were found to contain 22 percent by weight bound chlorine. Electrodialysis of the chlorinated products in aqueous media showed that little molecular degradation had occurred during chlorination.

Bromination was carried out in a similar manner with similar results.

Example XXII 80 grams of in-situ-weathered coal from the upper seam of Sheerness Mines, Alberta (locally known as "rusty" coal) were ground to -28 mesh and suspended in a mixture of 200 ml. water, 7.0 grams of sodium sulfite, and 7.5 grams of sodium or potassium phosphate were added and refluxed for 3 hours. The soluble product was separated from the insoluble matter and dried. The thinning properties of these products are shown in Table IB.

The metal complexes of sulfated humic acids were prepared by the following three-step method:

Step I – Humic acids present in lignite and oxidized coals were refluxed with sodium sulfite or bisulfite in an aqueous alkaline solution for 1 to 3 hours at about 100° C.

Step II– The separation of the soluble product from the insoluble matter.

Step III–The interaction with the desired polyvalent metal producing a water-soluble metal complex by chelating or co-ordinating one or more of the valencies of the metal ion.

Example XXIII

Ferrous Sulfated Humic Acids Complexes 80 grams of in-situ-weathered coal from the upper seam of Sheerness Mines, Alberta (locally known as "rusty" coal) were ground to -28 mesh and suspended in an alkali solution containing 12.5 grams sodium hydroxide in about 200 ml. water. 7 grams of sodium sulfite were added to the above mixture and refluxed for 3 hours. The soluble product was separated by centrifuging, and ferrous sulfate, containing up to 6 percent iron (calculated on the weight of organic solids in solution) and sodium oxalate, corresponding to two molecules of oxalic acid per atom of iron, were added, and the solution was dried. The thinning properties of some of these products are shown in Table IB.

Example XXIV (Chromium Sulfated Humic Acids Complexes)

Same as Example XXIII, but sodium chromate, instead of ferrous sulfate, was used, and sodium oxalate was omitted. The thinning properties of some of these products are shown in Table IB.

The water-soluble sulfated products of one aspect of this invention are useful as drilling mud thinners. These products may be used in any of the various drilling muds. Thus, they may be used in water-in-oil emulsions, oil-in-water emulsions or in full oil-phase drilling fluids.

In the drilling fluids of one aspect of this invention, the water-soluble sulfated products are dispersed in either the aqueous or oil phase. The drilling fluids containing the aforementioned water-soluble sulfated products have desirable rheological properties, notably viscosity and fluid loss, which are not adversely affected by the presence of soluble metal ions, primarily polyvalent metal ions such as calcium, derived from gypsum formations, salt deposits, or cement. Furthermore, the drilling fluids are capable of taking up a considerable proportion of the finely divided bit cuttings or drilled solids without adverse effect on the properties of the drilling fluids.

The drilling fluids can be prepared by any conventional method. The amount of water-soluble sulfated products, water, and oil employed are dependent upon several variables, such as the nature of the sulfonate itself, the density of the drilling fluid desired, the nature of the formation penetrated, and other factors that can be readily determined by those skilled in the art. It has long been customary in rotary well drilling operations to subject the drilling fluid to simple routine tests from time to time, and these tests are sufficient to indicate the relative amounts of sulfonate, water, or oil to be employed. Generally, the amount of water-soluble sulfated products employed will be sufficient to form a relatively thin, impervious filter cake on the wall of the well, and in an amount that will impart a sufficiently low viscosity to the drilling mud in order that it may readily be pumped and circulated. In general, the amount of water-soluble sulfated products added to the drilling fluid will be in the range from about 0.1 to about 10 pounds per barrel (42 U.S. gallons) of drilling fluid.

For water-in-oil emulsion systems, the amount of water to be employed would generally range from as low as 1 percent by weight of the final drilling fluid to 60 percent by weight, and preferably less than 40 percent by weight. For oil-in-water emulsions systems, the amount of water will be in the range from about between 99 to 60 percent by weight of the final emulsion and the amount of oil will be in the range from 1 to 40 percent by weight of the final emulsion.

The oil component used in preparing the oil-base and emulsion drilling fluids can be any hydrocarbon normally used for this purpose in the art, such as diesel fuel, crude oil, kerosene, gas oil, heavy fuel oil, various petroleum fractions, and the like.

Although the drilling fluids need only contain the water-dispersible and oil-dispersible water-soluble sulfated products as the material necessary to obtain desirable rheological properties, especially low fluid loss, it is also possible to add clays or other finely divided inorganic solids. In addition, materials commonly used for weighting purposes can be added, including finely divided limestone, baryte, lead sulfide, oyster shell, or the like. For emulsion systems, any suitable conventional emulsifying agent, such as the alkaline earth metal salts of saponifiable oils such as vegetable oils, wood oils, fish oils and the like, can be employed. Other applicable emulsifying agents include "-Dresinates," alkali metal salts of carboxy methyl cellulose, and the like.

In using the water-soluble sulfated products in the thinning of a well fluid comprising an aqueous dispersion of clay (e. g. to reduce the yield value of such fluid), the water-soluble sulfated products are added in the same manner, well known to those skilled in the art, as conventional caustic-quebracho, alkali lignite and other thinners have been used in the past. Thus, the water-soluble sulfated products can be simply added to the fluid and mixed therewith. The optimum amount to be employed will depend upon the characteristics of the particular well fluid being treated but generally an amount in the range of 0.5 to 10 pounds per barrel will suffice. In any event, the amount will be that sufficient to reduce the yield value of the well fluid as desired. Usually the pH of the fluid will be in the alkaline range (pH 7 to 14) but such is not necessary.

As noted before, the water-soluble sulfated products may be used in "full oil phase" drilling fluids. By "full oil phase" drilling fluid is meant a drilling fluid in which the liquid phase consists entirely of oil or consists of oil containing only a minor amount of emulsified water, i. e. water in the dispersed phase. Water can be a constituent of a drilling fluid, which otherwise would have a liquid phase consisting entirely of oil, by virtue of intentional addition of the water. Water can also be a constituent of such a drilling fluid by virtue of unintentional addition of water. Unintentional addition of water can occur as the result of rain entering pits or open vessels containing the drilling fluid and as the result of flow of water from a subterranean formation into the well borehole containing the fluid. The amount of emulsified water in a full oil phase drilling fluid preferably should not exceed 4 percent by volume of the liquid phase of the fluid. More preferably, the amount of emulsified water should be less than 4 percent by volume. It is particularly preferred that the amount of emulsified water not exceed 2 percent by volume of the liquid phase of the fluid.

It is not, of course, desired to be limited to any particular theory of the solubilization of the humic acids, lignites and low rank coals. However, it is believed that humic acids, lignites and low rank coals are rendered soluble according to the present invention by introduction of sulfonic groups into their molecule. Two possible mechanisms can be postulated for this reaction; one is based on the assumption that the alkali sulfite or bisulfite is splitting active methylene groups according to the following scheme:

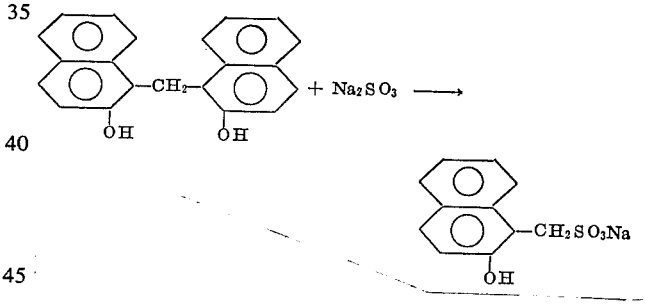

The second mechanism is by addition to quinonoid structures or other carbonyl groups. Active methylene groups and quinones have been found to be present in the molecule of humic acids, lignites and coals.

We claim:
1. A process which comprises:
   a. reacting humic acids, lignites or preoxidized coals with sulfonating agent selected from the group consisting of a sulfite, a bisulfite, and precursors thereof which form a sulfite or a bisulfite in situ, thereby to provide a water-soluble product;
   b. dissolving said product in water, thereby to provide a homogeneous aqueous solution;
   c. bubbling gaseous chlorine or bromine through said homogenous aqueous solution containing said sulfonated product to produce a chlorinated or brominated product.

2. The process of claim 1 wherein up to about 25 percent by weight of chlorine is incorporated into said water-soluble product.

3. The process of claim 1 wherein up to about 25 percent by weight of bromine is incorporated into said water-soluble product.

4. The process of claim 1 wherein the chlorination is effected by bubbling gaseous chlorine through an aqueous solution of said water-soluble product.

5. A chlorinated or brominated water-soluble sulfonated humic acid product.

6. The product of claim 5 containing up to 25 percent by weight chlorine.

7. The product of claim 5 containing up to 25 percent by weight bromine.

* * * * *